United States Patent
Ljungberg et al.

(10) Patent No.: US 6,865,276 B1
(45) Date of Patent: Mar. 8, 2005

(54) SYSTEM AND METHOD FOR NOISE SUPPRESSION IN A COMMUNICATION SIGNAL

(75) Inventors: Pèr Ljungberg, Lünd (SE); Johan Udén, Åkarp (SE); Peter Lakatos, Malmö (SE); Per Rosengren, Göteborg (SE); Andreas Nilsson, Malmö (SE); Ingvar Claesson, Dalby (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 856 days.

(21) Appl. No.: 09/680,024

(22) Filed: Oct. 5, 2000

Related U.S. Application Data (63) Continuation-in-part of application No. 09/432,988, filed on Nov. 3, 1999, now abandoned.

(51) Int. Cl.[7] .............................. H04B 15/00
(52) U.S. Cl. ................................. 381/94.1
(58) Field of Search ...................... 381/94.1, 71.1, 381/71.2, 71.8, 71.11, 71.12, 71.13, 71.14; 455/63.1, 67.13, 570

(56) References Cited

U.S. PATENT DOCUMENTS

| | | |
|---|---|---|
| 5,745,523 A | 4/1998 | Dent et al. |
| 6,269,093 B1 * | 7/2001 | Alapuranen et al. ........ 370/343 |
| 6,480,824 B2 * | 11/2002 | Christensson et al. ..... 381/71.9 |
| 6,608,904 B1 * | 8/2003 | Feltstrom ................... 381/71.1 |

FOREIGN PATENT DOCUMENTS

| | | |
|---|---|---|
| EP | 0 913 951 A2 | 6/1999 |
| WO | 97/31431 | 4/1997 |
| WO | 97/34290 | 4/1997 |
| WO | 9727712 | 7/1997 |

OTHER PUBLICATIONS

U.S. Appl. No. 09/432,988, filed Nov. 3, 1999.

* cited by examiner

*Primary Examiner*—Stella Woo
(74) *Attorney, Agent, or Firm*—Potomac Patent Group PLLC (57) ABSTRACT

A system and method for suppressing disturbance signal components in a communication signal is disclosed. The system and method utilize a priori information about the fundamental frequency of the disturbance signal component to generate an estimate of the disturbance signal component. This estimated disturbance signal may be subtracted from the communication signal to suppress the disturbance signal component in the communication signal.

28 Claims, 6 Drawing Sheets

SYSTEM AND METHOD FOR NOISE SUPPRESSION IN A COMMUNICATION SIGNAL

RELATED APPLICATIONS

The following application is a continuation-in-part application of U.S. application Ser. No. 09/432,988 filed Nov. 3, 1999, now abandoned the disclosure of which is hereby incorporated by reference.

BACKGROUND

The present invention relates to the suppression of a disturbance signal component of a communication signal, and more particularly to systems and methods for suppressing a periodic disturbance signal component having a known, or determinable, fundamental frequency, and its harmonic frequencies.

Many digital wireless systems in use today utilize a time slotted access system. An information signal (e.g., speech, data, video) is segmented, compressed, packetized and transmitted in a pre-allocated time slot. Time slots can be allocated to different users, a scheme commonly referred to as Time Division Multiple Access (TDMA). TDMA communication systems, such as the Global System for Mobile communications (GSM) in Europe, the Digital-Advanced Mobile Phone System (D-AMPS) system in North America, or the Personal Digital Cellular (PDC) system in Japan, allow a single radio frequency channel to be shared between multiple remote terminals, thereby increasing the capacity of the communication system. Also, Code Division Multiple Access (CDMA) access techniques use a framing structure to gather and transmit information across an air interface.

Time slots may also be allocated between alternating uplink and downlink transmissions, a scheme commonly referred to as Time Division Duplex (TDD). In a TDD system, the transmitter is inactive for a period of time during each frame, which period is of sufficient duration to receive a signal burst. The transmitter compensates for the loss of transmission time caused by this inactive period by buffering the digitized communication signal in a memory and subsequently transmitting the buffered communication signal at a higher rate than the rate at which it was buffered during its allocated slot. The peak transmitter power is increased by the same factor to support the higher rate.

In a GSM system, the TDMA circuits are switched on and off at a frequency of approximately 217 Hz. Switching the TDMA circuits creates a disturbance component at this frequency, referred to herein as the fundamental frequency, and its harmonic frequencies. The disturbance component is coupled into the communication signal, and may interfere with the information signal component of the communication signal. When the information signal component represents speech input, the disturbance signal component, if not suppressed, can cause an audible buzz, sometimes referred to as a "bumblebee" noise in the communication signal.

Existing radiotelephone or cellular communication systems suppress the bumblebee noise using various analog noise suppression techniques. For example, bumblebee noise can be suppressed by electrically decoupling the radio circuits, or by using microphones adapted to minimize the noise. Also digital techniques, such as digital noise cancellors, can be used to suppress bumblebee noise. However, digital noise chancellors are adaptive in nature, i.e., they estimate the noise and do not make use of prior knowledge of disturbing frequencies. As such, these techniques require costly components and can be difficult to implement. These techniques can also require the use of non-optimal system settings such as, for example, compensating offsets in microphone gain.

Linear notch filters can also be used to filter disturbance signals at known frequencies. However, an analysis of a Fourier expansion of a disturbing periodic signal that creates a bumblebee noise illustrates that the rate of decay of the frequency components of the disturbance signal is inversely proportional to the frequency (e.g., 1/frequency). Consequently, it is not effective to filter only the first few frequency components of the disturbing signal, because there are approximately fifteen frequency components having magnitudes large enough that they must be suppressed in the audible frequency band below 4 KHz. The computational complexity of implementing fifteen notch filters renders this option undesirable.

Accordingly, there is a need in the art for systems and methods for suppressing periodic disturbance components from communication signals.

SUMMARY

The present invention addresses these and other needs by providing a system and method that uses a priori knowledge that the disturbance signal component comprises a sum of sinusoids of known, or determinable, frequencies to derive an estimate of the disturbance signal component. In a preferred embodiment, the system uses a priori knowledge that the disturbance signal component has a fundamental frequency that corresponds to the 217 Hz frequency at which TDMA circuits are switched on and off to estimate the disturbance signal component. The estimated disturbance signal component can be subtracted from the communication signal. Preferably, the disturbance signal component is suppressed before the communication signal is transmitted. However, the communication signal may be transmitted with the disturbance signal component intact, and the disturbance signal component may be estimated and subtracted in a receiver.

In one embodiment, the invention provides a method of suppressing a periodic disturbance signal component of a communication signal, in which the disturbance signal component has a fundamental frequency. The method comprises the steps of generating an estimated disturbance signal component by correlating the communication signal with at least one of a sinusoid that is a function of the fundamental frequency and a cosinusoid that is a function of the fundamental frequency, and subtracting the estimated disturbance signal component from the communication signal. Preferably, the step of generating an estimated disturbance signal component comprises estimating the amplitude and phase of the disturbance signal component at the fundamental frequency, and its harmonic frequencies in a predetermined frequency range, and summing a sinusoidal function of the amplitude and phase of the disturbance signal component over a predetermined number of frequency components. The communication signal may then be transmitted to a receiver.

In another embodiment, the invention provides a method of suppressing a periodic disturbance signal component of a communication signal, in which the disturbance signal component has a fundamental frequency. The method comprises calculating a first correlation array between the communication signal and a sinusoid having a frequency that is a function of the fundamental frequency, calculating a second correlation array between the communication signal and a cosinusoid having a frequency that is a function of the fundamental frequency, estimating the amplitude and phase of the disturbance signal component at the fundamental frequency and a predetermined number of harmonic frequencies, calculating the estimated disturbance signal component as the sum, over the fundamental frequency and a predetermined number of harmonic frequencies, of a sinusoid that is a function of the fundamental frequency, and subtracting the estimated disturbance signal component from the communication signal.

In another embodiment, the invention provides a system for suppressing a periodic disturbance signal component having a fundamental frequency in a communication signal. The system comprises a module for estimating portions of the disturbance signal component by correlating the communication signal with a sinusoid having a frequency that is a function of the fundamental frequency and a cosinusoid having a frequency that is a function of the fundamental frequency, a module for generating a disturbance signal representative of the disturbance signal component estimate, and a module for subtracting the estimated disturbance signal component from the from the communication signal.

In a further embodiment, the invention provides a remote communication terminal. The terminal comprises a conversion module for converting an analog signal into a communication signal comprising a set of digitized samples, a processor for receiving the digitized samples from the conversion module and calculating an estimate of a disturbance signal component of the communication signal, and a module for subtracting the estimate of a disturbance signal component from the communication signal.

BRIEF DESCRIPTION OF THE DRAWINGS

These and other features of the invention will become more apparent upon reading the following detailed description in conjunction with the following drawings, in which.

DETAILED DESCRIPTION

Figure 1:
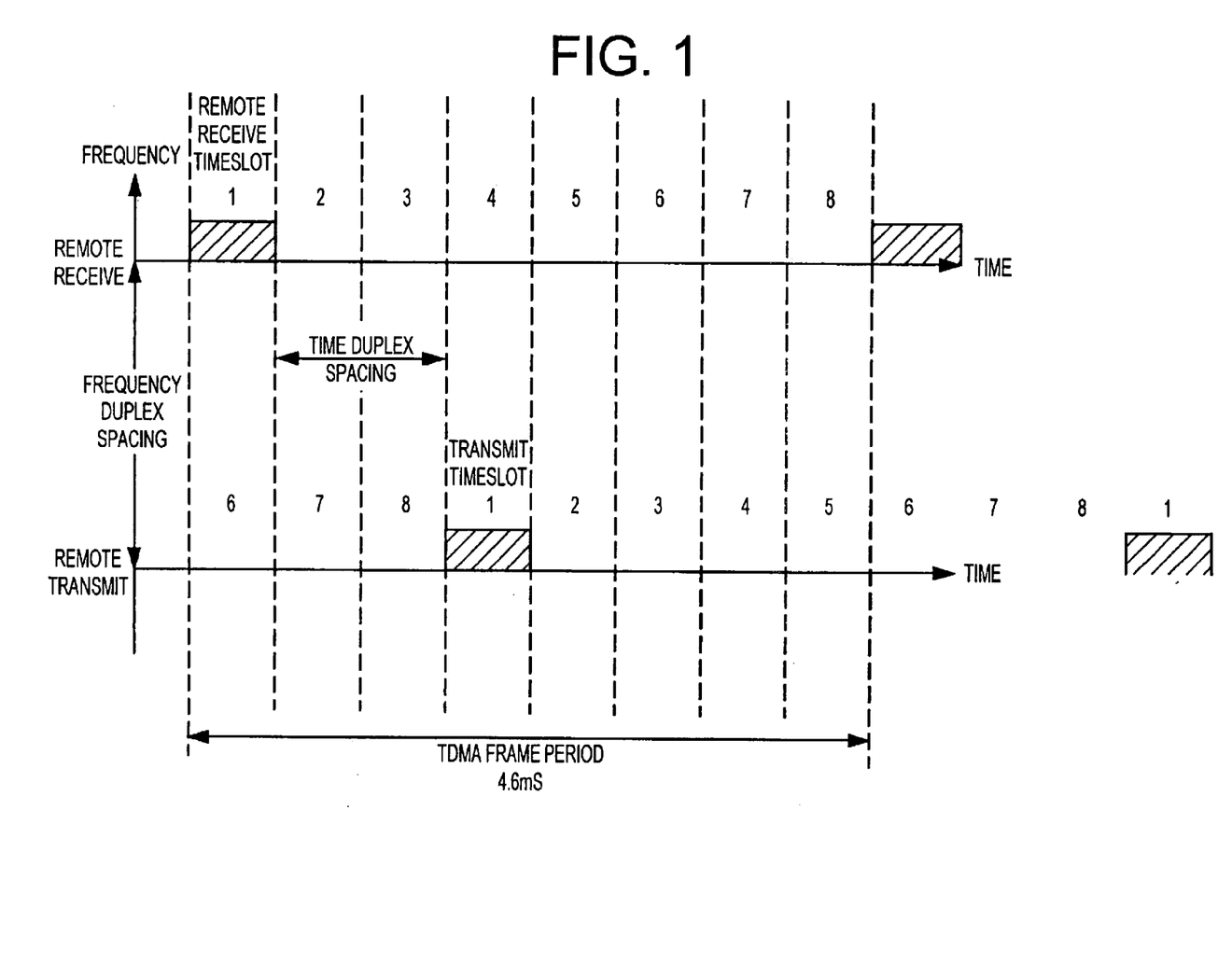
FIG. 1 is a schematic depiction of a transmission format used in a GSM system, which format is used to describe the present invention.

FIG. 1 is an example of the transmission format employed in the TDMA cellular system referred to as GSM. Therein, a repetitive frame period of approximately 4.6 ms is divided into eight timeslots. Remote terminals receive on a radio channel in a receive frequency band, each terminal receiving in an allocated one of the eight timeslots, e.g., receive timeslot 1 in FIG. 1. The terminal also transmits on a channel in the transmit frequency band in an allocated timeslot, e.g., transmit timeslot 1 in FIG. 1. Transmit timeslots are staggered in time relative to their corresponding receive timeslots so that the terminal does not have to transmit and receive at the same time. This is illustrated in the example of FIG. 1 as the time duplex spacing of two timeslots between timeslot 1 on terminal receive frequency and timeslot 1 on the terminal transmit frequency. When different transmit and receive bands are employed, the base station may receive and transmit in all timeslots, and thus support eight communication sessions in the same transmit/receive channel pair. Otherwise, if no frequency-duplex spacing is employed, the base station can, for example, use four of the timeslots for transmission and four for reception, thus supporting four communication sessions in a single transmit/receive channel. In GSM, timeslots not used by a particular terminal for transmission and reception are available for connection management purposes, e.g., to manage hand-overs to other base stations.

The transmit pulse formats are defined by the GSM specifications and include a guard time between bursts, an up/down-ramping time to turn the transmitter power smoothly on and off to avoid spectral splatter into unsynchronized adjacent channels, some guard bits at each end of each burst, and the main body of the TDMA burst which transmits 114 data bits, 26 sync bits, and two control bits at a flat power level. The up/down ramping times are adequate to prevent spectral spreading into an adjacent channel 200 KHz away, but are not designed to control harmonics of the approximately 217 Hz pulse repetition rate in the audio band of 300 Hz to 4 KHz. Electrical signals at the 217 Hz frequency and its harmonic frequencies may be coupled into the analog microphone signal in the terminal, creating a disturbing signal that can cause an annoying buzzing sound in the speech signal transmitted by the terminal.

Figure 2:
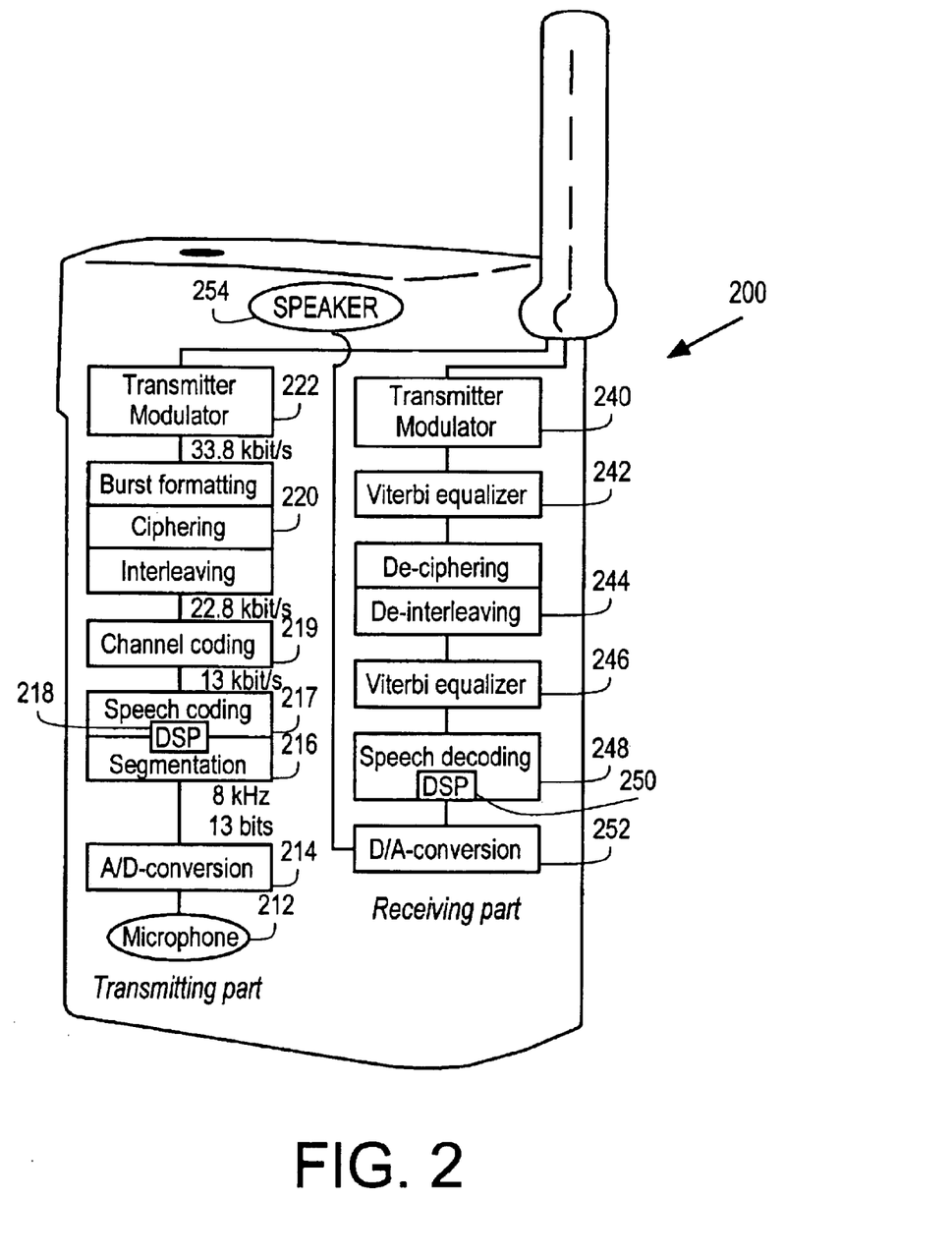
FIG. 2 is a schematic depiction of a communication terminal embodying a disturbance signal suppressor circuit in accordance with an embodiment of the present invention.

FIG. 2 is a schematic diagram of a remote communication terminal 200 in which an embodiment of the invention may be implemented. In an exemplary embodiment, remote terminal 200 is a mobile phone (e.g., mobile station, mobile terminal, etc.) adapted for use in a digital TDMA cellular communication system, such as, for example, the GSM system in Europe, the PDC system in Japan, or the D-AMPS system in North America. It will be appreciated, however, that the present invention is not limited to a particular access system. Principles of the present invention are applicable in any type of communication system in which suppression of periodic interference is of interest. Remote terminals are widely known and readily commercially available. Accordingly, only those aspects of remote terminal 200 that are pertinent to the present invention are described in detail. For additional information relating to remote terminals, the interested reader is referred to U.S. Pat. No. 5,745,523 to Dent et al., the disclosure of which is incorporated here by reference.

Referring to FIG. 2, remote terminal 200 includes a transmitting part and a receiving part. In the transmitting part, an analog speech signal from microphone 212 is digitized by an analog-to-digital (A/D) converter 214. Segmentation unit 216 divides the digitized speech signal into 20 ms segments, which are coupled to the speech coder 217. Speech coder 217 reduces the bit rate of the digitized speech signals, such that the resulting speech channels can remain within the allowed frequency band. The bit rates depicted in FIG. 2 are per physical channel.

In one embodiment, the present invention is implemented in the transmitting part of remote terminal 200. A Digital Signal Processor (DSP) or similar type of digital processor 218 is associated with the speech coder 217 to receive the incoming stream of digitized speech samples from speech coder 217. In brief, processor 218 calculates an estimate of the disturbing signal by estimating the amplitude $A_n$ and the phase $\phi_n$ at each frequency component of the disturbance signal component. The disturbance signal components are summed to derive an estimate of the disturbing signal. The estimated disturbance signal component may then be subtracted from the communication signal to suppress the disturbance signal component of the communication signal. The approximated speech signal may then be directed to a module 219 for channel coding, a module 220 for interleaving, encoding, and burst formatting, and a module 222 for modulating a carrier and transmitting over a communication channel.

The receiving part of remote terminal 200 includes a module 240 for receiving and demodulating a carrier, a viterbi equalizer 242, a module 244 for deciphering and de-interleaving the received communication signal, a module 246 for decoding the signal, and a module 248 for decoding the speech (e.g., the information) component of the signal. In another embodiment, the invention may be implemented in the receiving part of remote terminal 200. A Digital Signal Processor (DSP) or similar type of digital processor 250 is associated with the speech decoder 248 to receive the incoming stream of digitized speech samples, which represents the communication signal, from speech decoder 248. In brief, processor 250 calculates an estimate of the disturbance signal component by estimating the amplitude $A_n$ and the phase $\phi_n$ at each frequency component of the disturbing signal component. The estimated disturbance signal component may be subtracted from the communication signal, which is then sent to a module 252 for digital-to-analog (D/A) conversion and to a suitable speaker 254.

Figure 3:
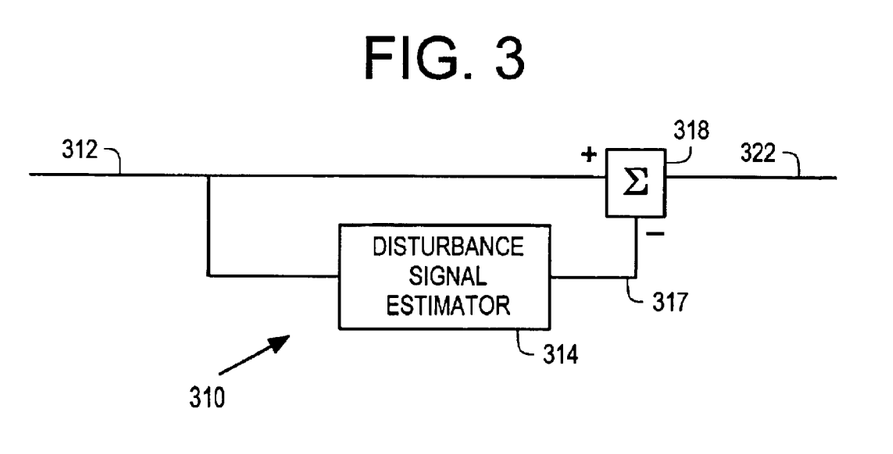
FIG. 3 is a schematic depiction of a disturbance signal suppressor circuit in accordance with an embodiment of the present invention.

FIG. 3 is a schematic depiction of a disturbance signal suppressor circuit 310 in accordance with an embodiment of the present invention. Disturbance signal suppressor 310 receives a communication signal, here applied on line 312. The communication signal includes an information signal component and a disturbance signal component. Among the disturbance signal components which might be superimposed upon the information signal is a periodic disturbance signal, such as the disturbance signal introduced by TDMA or other framing circuits switching on and off.

Disturbance signal suppressor circuit 310 shown in FIG. 3 includes a disturbance signal component estimator 314 coupled to line 312 to receive the signal applied thereon. The disturbance signal component estimator 314 generates a signal on line 317 that is an estimate of the disturbance signal component. Line 317 is coupled to a negative input of a summing device (e.g., a summer) 318. Line 312, upon which the communication signal is applied, is applied to a positive input terminal on summer 318. Summer 318 subtracts the disturbance signal component estimate on line 317 from the communication signal on line 312 to produce a disturbance signal-suppressed communication signal on line 322.

In an exemplary embodiment, disturbance signal suppressor circuit 310 forms a portion of the transmitter, such that a periodic disturbance signal (e.g., the disturbance signal component) is removed from the communication signal prior to transmission. In an alternate embodiment, disturbance signal suppressor circuit may be implemented in a receiver, such that a periodic disturbance signal in communication signals received by the receiver is removed before the communication signal is provided to a listener positioned at the receiver.

Figure 4:
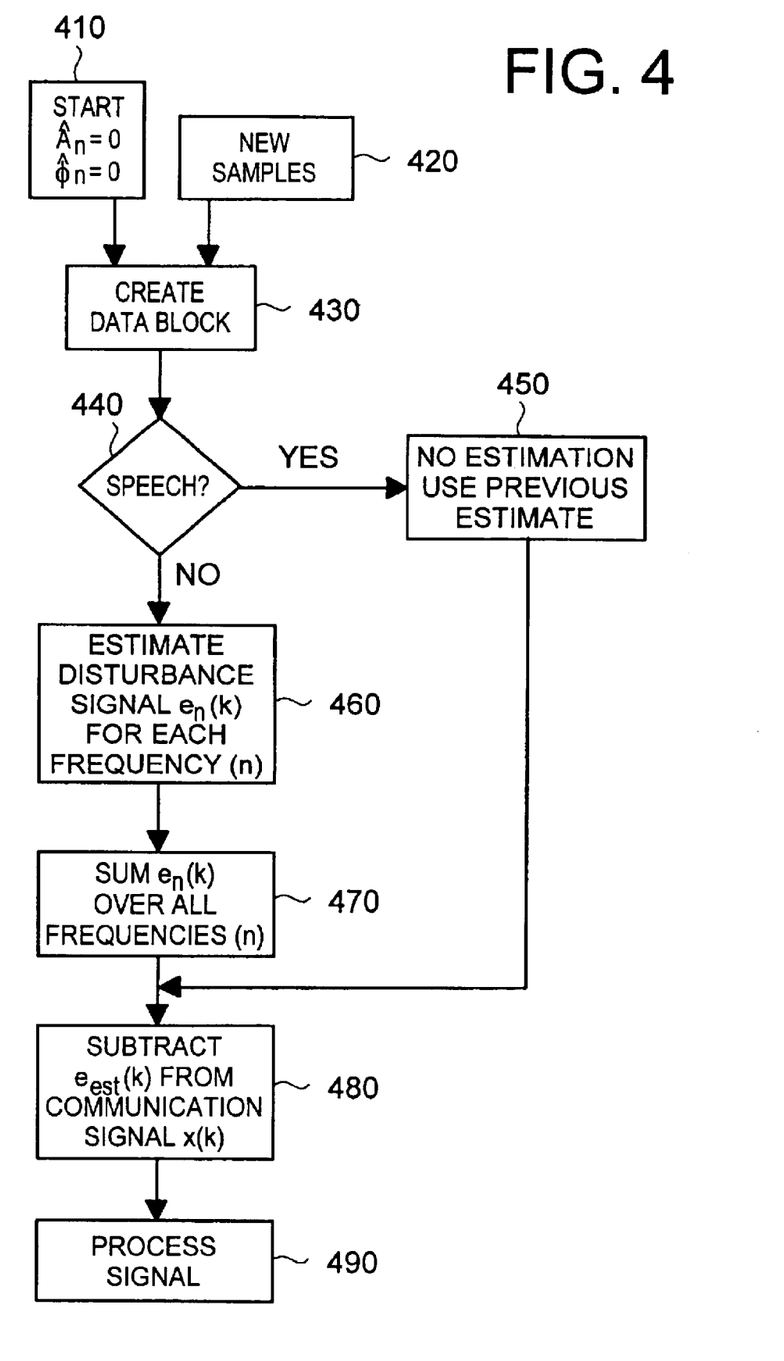
FIG. 4 is a flow chart illustrating a method of suppressing disturbance signal in a communication signal in accordance with an embodiment of the present invention.

FIG. 4 is a flow chart illustrating a method of suppressing a disturbance signal component in a communication signal in accordance with an embodiment of the present invention. In brief, the process begins at step 410, preferably when a communication session is initiated and the phase and amplitude estimates of the disturbance signal component are set to zero. The sampled communication signal is received at 420. At step 430 the communication signal is gathered into a block. At step 440, a test is conducted to determine whether speech input is being received by the remote terminal. If speech input is not being received by the remote terminal, then the disturbance signal component is estimated at step 460, and at step 470 the estimated disturbance signal components at the fundamental frequency and its higher harmonic frequencies are summed. At step 480, the estimated disturbance signal is subtracted from the communication signal to suppress the disturbance component. If, at step 440, speech input is being received by the remote terminal, then the disturbance signal component is not estimated (step 450), and during the subtraction, at step 480, the previous estimate of the disturbance signal component is used. At step 490, the communication signal may be processed as required for transmission, or for presentation to the user if the method of FIG. 4 is implemented in a receiver. The process of estimating the disturbance signal component is explained in greater detail below.

At step 460, the present invention makes use of a priori knowledge that the disturbance signal component consists of a sum of harmonically related sinusoids to calculate an estimated disturbance signal component. More particularly, the disturbance signal component can be expressed as:
where:
e=the disturbance signal component;
n=the number of the frequency component;
m=the highest harmonic frequency of interest (m=15 in one embodiment);
$A_n$=the amplitude of the $n^{th}$ frequency component;
K=the number of samples in an input block;

$$e(k) = \sum_{m=1}^{m} A_n \cdot \sin\left(2\pi\left(n\frac{f_0}{f_s}\right)k + \phi_n\right), k \in [0, K-1] \quad (1)$$

k = a counter that counts all samples in an input block ($k \in [0, K-1]$);

$f_0$=the fundamental frequency (216.67 Hz in GSM);
$f_1$=the frequency at which the input information is sampled (8 KHz in GSM); and
$\phi_n$=the phase of the $n^{th}$ frequency component.

Adopting the notation that a communication signal, y, is the sum of an information signal, x, and a disturbance signal component, e, this relationship may be expressed mathematically as follows:

$$y = x + e \quad (2)$$

An estimate of the disturbance signal component, $e_{est}$, can be derived using equation (1) by generating an estimate of the amplitude, $A_n$, and the frequency, $\phi_n$, of each frequency component, n, of the disturbance signal component. The estimated disturbance signal component, $e_{est}$, can then be subtracted from the communication signal to suppress the disturbance signal component.

$$x_{est} = y - e_{est} = x + e - e_{est} \quad (3)$$

The estimation of the amplitude $A_n$ and phase $\phi_n$ may be performed by calculating the correlation between the communication signal (y) and $\sin(2\pi knf_0/f_s)$ and $\cos(2\pi knf_0/f_s)$, where k is a counter that counts all samples in a given block. The correlation equations may be expressed mathematically as follows:

$$x_{est} = x + \sum_{n=1}^{15} A_n \cdot \sin\left(2\pi\left(n\frac{f_0}{f_s}\right)k + \phi_n\right) - \quad (8)$$

$$\sum_{n=1}^{15} A_{n,est.} \cdot \sin\left(2\pi\left(n\frac{f_0}{f_s}\right)k + \phi_{n,est.}\right) \text{ and}$$

$$B_{n,est.} = \frac{2}{K}\sum_{k=1}^{K} y_k \cdot \sin\left(2\pi\left(n\frac{f_0}{f_s}\right)k\right) \quad (4)$$

$A_{n,est}$ and phase $\phi_{n,est}$ of the disturbance signal component can be estimated, respectively, $$C_{n,est.} = \frac{2}{K}\sum_{k=1}^{K} y_k \cdot \cos\left(2\pi\left(n\frac{f_0}{f_s}\right)k\right) \quad (5)$$

$$A_{n,est} = ((B_{n,est})^2 + (C_{n,est})^2)^{1/2} \quad (6)$$

and $$\phi_{n,est} = atan(C_{n,est}/B_{n,est}) \quad (7)$$

After performing the correlations of equations (4) and (5) for the fundamental frequency and all n−1 harmonic frequencies, an estimate of the amplitude $A_{n,est}$ and the phase $\phi_{n,est}$ of the disturbance signal component at each harmonic can be determined using equations (6) and (7). An estimate of the disturbance signal component can then be calculated using equation (1) and then subtracted from the communication signal as illustrated in equation (3) to suppress the disturbance signal in the information signal. In mathematical terms:

In a preferred embodiment, the correlation calculations set forth in equations (4) and (5) are performed on a frame size over which the fundamental frequency has an integer number of periods. If the fundamental frequency produces an integer number of periods for the selected block size, then all higher harmonic frequencies will also produce an integer number of periods. In a GSM system, a frame size of 480 samples taken at an 8 KHz rate produces exactly 13 periods of a 216.67 Hz disturbance signal, and therefore satisfies this criteria. It will be appreciated that the frames can be staggered so that a delay of 480 samples is not required. For example, correlations can be performed on 480-sample frames using each new 160 samples received by the terminal (e.g., 320 previously received sample frames). This increases the computational load on the terminal's processor, but decreases the delay in providing error correction.

In a preferred embodiment, the estimation process is performed during pauses in speech input to avoid incorporating energy from the speech signal (e.g., the information signal) in the calculation of the disturbance signal component. Human speech includes frequency components at the same frequency as the energy that creates the bumblebee noise, and can interfere with measurement of the disturbance signal component. GSM speech coders include a Voice Activity Detector (VAD) for detecting whether the remote terminal is receiving voice input associated with the Digital Signal Processor. Accordingly, a remote terminal according to the present invention may be adapted to receive a signal from the VAD to indicative of whether speech input is present, and to measure the disturbance signal component only when the signal indicates that no speech input is present.

Figure 5:
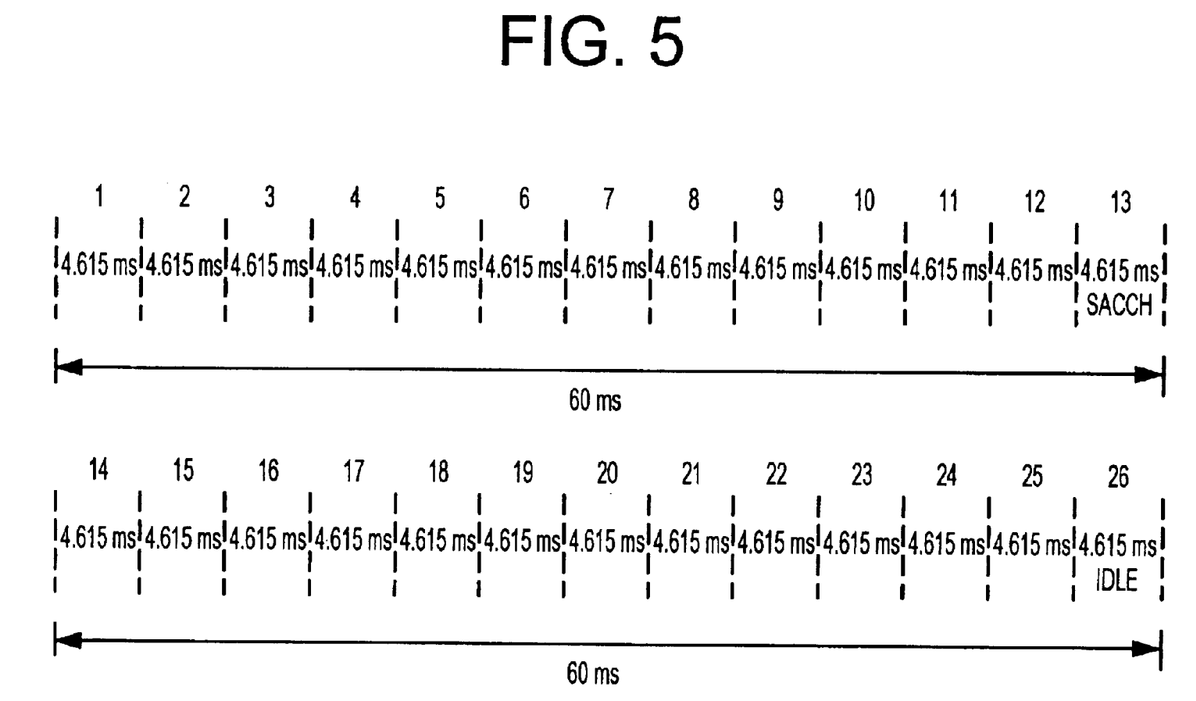
FIG. 5 is a schematic depiction of a TDMA multiframe used in a GSM communication system.

According to a further aspect, the present invention may be adapted to compensate for secondary disturbance signals introduced by transmission schemes that include one or more idle time slots, e.g.; time slots in which no information is transmitted. By way of example, and not by limitation, a GSM communication system compiles 26 TDMA frames, each representing 4.615 ms, into a 120 ms multiframe. An exemplary TDMA multiframe is illustrated in FIG. 5. Frames 1–12 and 14–25 are required for transmission of speech coded data. Frame 13 is used for transmission of the slow associated control channel (SACCH) control data frame. TDMA frame 26 is an idle frame, in which there is no radio transmission. Because the radio of the remote terminal is not transmitting during the idle frame, the disturbance signal is zero during this time period.

Due to the absence of radio transmission during the idle frame, the disturbance signal introduced by the switching of the TDMA circuits is not perfectly periodic with the TDMA frame rate. If the disturbance signal is modeled as set forth above (e.g., using equation (1)), then the estimated disturbance signal is periodic. Subtracting the estimated disturbance signal, which is periodic, from the communication signal to compensate for a disturbance signal that is not perfectly periodic may introduce a secondary periodic disturbance signal into the communication signal. The fundamental frequency of the secondary disturbance introduced into the communication signal is approximately 8 Hz (e.g., 1/120 ms).

To avoid introducing a secondary disturbance signal into the communication signal, a remote communication terminal according to the present invention deactivates the circuitry that subtracts the estimated disturbance signal, $e_{est}$, from the communication signal during the idle frame (e.g., frame 26 in the TDMA multiframe). In an exemplary embodiment, a remote terminal uses a synchronization code embedded in commands passed between the DSP and the terminal's processor to locate an idle frame in the TDMA multiframe structure. Once the idle frame is located, the circuitry for subtracting the estimated disturbance signal may be deactivated during the idle frame's time slot to avoid introducing a secondary disturbance signal into the communication signal.

More particularly, in a remote terminal that operates in accordance with the GSM standard, the terminal's processor communicates with the DSP using commands. Importantly, the DSP is supplied with information that can be used to identify the location of the idle frame in the GSM multiframe structure. In accordance with the present invention, a logic unit operational in the processor (or the DSP) uses the information to identify the idle frame in the multiframe structure and to generate a signal that deactivates the circuitry for subtracting the estimated disturbance signal component from the communication signal during the idle frame. Deactivating this circuitry precludes the introduction of a secondary disturbance signal into the communication signal.

In one exemplary embodiment, the idle frame may be located using "synchinfo" bits associated with the code and decode commands transmitted between the DSP and the host ASIC of a communication terminal. In a GSM system, the host ASIC transmits a code command to the DSP at intervals of 18.465 ms, 18.465 ms, 23.070 ms, such that over a period of three code commands the average time duration between transmissions is 20 ms. A code command issued from the host ASIC initiates a reply from the DSP. The reply contains speech coded data from the 160 most recently received pulse code modulation (PCM) samples.

The code commands transmitted from the host ASIC include a "synchinfo" field which contains information that indicates the time duration to the next code command. The "syncinfo" field contains one of six possible values, each of which correspond to a specific time position in the 120 ms multiframe structure. Thus, the position of the idle frame may be determined from the "syncoinfo" information in the code commands.

To avoid introducing a secondary periodic disturbance signal into the communication signal, a remote terminal according to another embodiment of the invention is adapted to introduce a disturbance signal component into the idle time slot before the bumblebee noise is filtered from the communication signal. This is illustrated schematically in FIG. 6.

Figure 6:
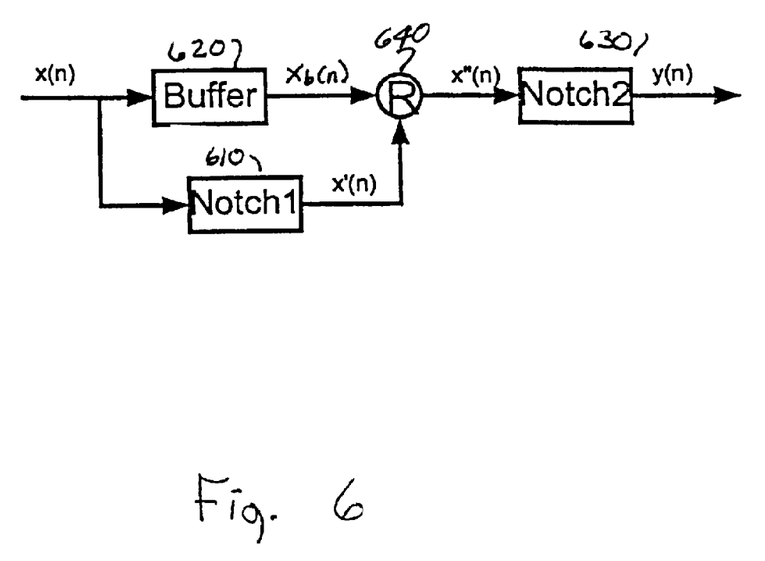
FIG. 6 is a schematic depiction of a disturbance signal suppressor circuit in accordance with another embodiment of the invention.

Referring to FIG. 6, the input signal x(n) is transmitted to a first notch filter 610 and to a buffer 620. First notch filter 610 generates an output signal x'(n) in which preferably the idle frame (e.g., frame 26 in a GSM TDMA frame), includes a disturbance signal component corresponding to the periodic disturbance signal. In a GSM system, first notch filter 610 preferably generates a disturbance signal component having a fundamental frequency of approximately 217 Hz, and also includes higher order harmonic frequency components. Preferably, first notch filter 610 has a sufficiently narrow bandwidth so that first notch filter 610 introduces the disturbance signal only into the idle frame. However, it will be appreciated that the bandwidth of first notch filter 610 may be such that additional time frames are affected by the disturbance signal.

The idle frame of the buffered output signal $x_b(n)$ is then replaced in the replacement circuit 640 with the respective idle frame in the output signal of x'(n) to produce a signal x"(n) in which the idle frame includes a periodic disturbance signal component. This replacement may be performed using suitable circuitry, e.g., a summer. The replacement circuitry 640 locates the idle frame in the multiframe structure using the synchinfo bit as described above.

The signal x"(n) is input to a second notch filter 630 which suppresses the bumblebee disturbance signal in the time frame. In a GSM system, second notch filter 630 preferably subtracts a disturbance signal component having a fundamental frequency of approximately 217 Hz, and also includes higher order harmonic frequency components corresponding to those introduced by first notch filter 610. Preferably, second notch filter 630 operates on the entire multiframe structure. Advantageously, because the idle frame includes a disturbance signal component, second notch filter will not introduce a secondary periodic disturbance signal into the communication signal.

The present invention is described above with reference to particular embodiments, and it will be readily apparent to those skilled in the art that it is possible to embody the invention in forms other than those described above. The particular embodiments described above are merely illustrative and should not be considered restrictive in any way. The scope of the invention is determined given by the following claims, and all variations and equivalents that fall within the range of the claims are intended to be embraced therein.

What is claimed is:

1. A method of suppressing a periodic disturbance signal component of a communication signal, the disturbance signal component having a known or determinable fundamental frequency, comprising:

generating an estimated disturbance signal component by correlating the communication signal with at least one of a sinusoid that is a function of the fundamental frequency and a cosinusoid that is a function of the fundamental frequency;

subtracting the estimated disturbance signal component from the communication signal; and compensating for a secondary disturbance associated with the subtracting of the estimated disturbance signal component from the communication signal in a transmission scheme having periods in which no information is transmitted.

2. A method according to claim 1, wherein the step of generating an estimated disturbance signal component comprises correlating the communication signal with a sinusoid that is a function of the fundamental frequency and a cosinusoid that is a function of the fundamental frequency.

3. A method according to claim 1, wherein the step of generating an estimated disturbance signal component comprises correlating the communication signal over a predetermined number of samples, the predetermined number selected such that a sinusoid that is a function of the fundamental frequency has an integer number of periods.

4. A method according to claim 1, wherein the step of generating an estimated disturbance signal component comprises estimating the amplitude and phase of the disturbance signal component at the fundament frequency.

5. A method according to claim 4, wherein the predetermined frequency range corresponds to a frequency range audibly detectable by the human ear.

6. A method according to claim 1, wherein the step of generating an estimated disturbance signal component comprises estimating the amplitude and phase of the disturbance signal component at the fundamental frequency, and its harmonic frequencies in a predetermined frequency range.

7. A method according to claim 1, wherein the step of generating an estimated disturbance signal component comprises estimating the amplitude and phase of the disturbance signal component at the fundamental frequency, and its harmonic frequencies in a predetermined frequency range, and summing a sinusoidal function of the amplitude and phase of the disturbance signal over a predetermined number of frequency components.

8. A method according to claim 1, further comprising the step of processing the communication signal for transmission.

9. A method according to claim 1, wherein compensating for the secondary disturbance comprises:

determining the position of an idle frame where no information is transmitted in a multiframe structure transmission scheme; and suspending the subtracting of the estimated disturbance signal component from the communication signal during processing of the idle frame.

10. A method according to claim 1, wherein compensating for the secondary disturbance comprises:

determining the position of an idle frame where no information is transmitted in a multiframe structure transmission scheme; and adding a disturbance signal component into the idle frame.

11. A method of suppressing a periodic disturbance signal component of a communication signal, the disturbance signal component having a known or determinable fundamental frequency, comprising:

(a) calculating a first correlation array between the communication signal and a sinusoid that is a function of the fundamental frequency;

(b) calculating a second correlation array between the communication signal and a cosinusoid that is a function of the fundamental frequency;

(c) estimating the amplitude and phase of the disturbance signal component at the fundamental frequency and a predetermined number of harmonic frequencies;

(d) calculating the estimated disturbance signal as the sum, over the fundamental frequency and a predetermined number of harmonic frequencies, of a sinusoid that is a function of the fundamental frequency;

(e) subtracting the estimated disturbance signal from the communication signal; and (f) compensating for a secondary disturbance associated with the subtracting of the estimated disturbance signal from the communication signal in a transmission scheme having periods in which no information is transmitted.

12. A method according to claim 11, wherein the step of calculating a first correlation array comprises calculating:

$$B_{n,est.} = \frac{2}{K}\sum_{k=1}^{K} y_k \cdot \sin\left(2\pi\left(n\frac{f_0}{f_s}\right)k\right).$$

13. A method according to claim 11, wherein the step of calculating a first correlation array comprises calculating:

$$C_{n,est.} = \frac{2}{K}\sum_{k=1}^{K} y_k \cdot \cos\left(2\pi\left(n\frac{f_0}{f_s}\right)k\right).$$

14. A method according to claim 11, wherein the step of estimating the amplitude of the disturbance signal component comprises calculating, for the fundamental frequency and a predetermined number of harmonic frequencies, the following:

$$A_{n,est}=((B_{n,est})^2+(C_{n,est})^2)^{1/2}.$$

15. A method according to claim 11, wherein the step of estimating the phase of the disturbance signal component comprises calculating, for the fundamental frequency and a predetermined number of harmonic frequencies, the following:

$$\phi_{n,est}=atan(C_{n,est}/B_{n,est}).$$

16. A method according to claim 11, wherein the step of calculating the estimated disturbance signal comprises calculating:

$$e(k)_{est} = \sum_{n=1}^{15} A_{n,est} \cdot \sin\left(2\pi\left(n\frac{f_0}{f_s}\right)k + \phi_{n,est}\right), k \in [0, K-1].$$

17. A method according to claim 11, further comprising the step of processing the communication signal for transmission.

18. A method according to claim 11, wherein steps (a) through (e) are performed in a remote communication terminal, and further comprising the step of detecting whether the remote terminal is receiving speech input, and wherein steps (a) through (c) are performed only when there is no speech input to the remote terminal.

19. A method according to claim 11, wherein compensating for the secondary disturbance comprises:
determining the position of an idle frame where no information is transmitted in a multiframe structure transmission scheme; and
suspending the subtracting of the estimated disturbance signal component from the communication signal during processing of the idle frame.

20. A method according to claim 11, wherein compensating for the secondary disturbance comprises:
determining the position of an idle frame where no information is transmitted in a multiframe structure transmission scheme; and
adding a disturbance signal component into the idle frame.

21. A system for suppressing a periodic disturbance signal component having a fundamental frequency in a communication signal, comprising:

a module for generating an estimated disturbance signal component by correlating the communication signal with a sinusoid that is a function of the fundamental frequency and a cosinusoid that is a function of the fundamental frequency;
a module for subtracting the estimated disturbance signal from the communication signal; and
a module for compensating for a secondary disturbance associated with the subtracting of the estimated disturbance signal from the communication signal in a transmission scheme having periods in which no information is transmitted.

22. The system of claim 21, wherein the module for compensating for the secondary disturbance comprises:
circuitry for determining the position of an idle frame where no information is transmitted in a multiframe structure transmission scheme; and
circuitry for deactivating the module for subtracting the estimated disturbance signal from the communication signal during processing of the idle frame.

23. The system of claim 21, wherein the module for compensating for the secondary disturbance comprises:
circuitry for determining the position of an idle frame where no information is transmitted in a multiframe structure transmission scheme; and
circuitry for adding a disturbance signal component into the idle frame.

24. A remote communication terminal, comprising:
a conversion module for converting an analog signal into a communication signal comprising a set of digitized samples;
a processor for receiving the digitized samples from the conversion module and calculating an estimate of a disturbance signal component; ard
a module for subtracting the estimated disturbance signal component from the communication signal; and
a module for compensating for a secondary disturbance associated with the subtracting of the estimated disturbance signal from the communication signal in a transmission scheme having periods in which no information is transmitted.

25. A remote communication terminal according to claim 24, further comprising:
a module for formatting the communication for transmission.

26. A remote communication terminal according to claim 24, further comprising:
a module for transmitting the communication signal.

27. The remote communication terminal of claim 24, wherein the module for compensating for the secondary disturbance comprises:
circuitry for determining the position of an idle frame where no information is transmitted in a multiframe structure transmission scheme; and
circuitry for deactivating the module for subtracting the estimated disturbance signal component from the communication signal during processing of the idle frame.

28. The remote communication terminal of claim 24, wherein the module for compensating for the secondary disturbance comprises:
circuitry for determining the position of an idle frame where no information is transmitted in a multiframe structure transmission scheme; and
circuitry for adding a disturbance signal component into the idle frame.

* * * * *